United States Patent [19]

Trew et al.

[11] Patent Number: 5,280,530
[45] Date of Patent: Jan. 18, 1994

[54] METHOD AND APPARATUS FOR TRACKING A MOVING OBJECT

[75] Inventors: Timothy I. P. Trew, Horley, England; Gabriele C. Seeling, Berlin, Fed. Rep. of Germany

[73] Assignee: U.S. Philips Corporation, New York, N.Y.

[21] Appl. No.: 755,384

[22] Filed: Sep. 5, 1991

[30] Foreign Application Priority Data

Sep. 7, 1990 [GB] United Kingdom ................. 9019538

[51] Int. Cl.$^5$ ............................................. G06K 9/00
[52] U.S. Cl. ......................................... 382/1; 382/48; 382/30; 358/105
[58] Field of Search ................... 382/1, 48, 30, 16, 34, 382/36, 42; 358/105, 125; 342/64; 364/510; 395/152

[56] References Cited

U.S. PATENT DOCUMENTS

| | | | |
|---|---|---|---|
| 4,644,582 | 2/1987 | Morishita et al. | 382/44 |
| 4,760,445 | 7/1988 | Mijiyawa | 358/105 |
| 4,799,131 | 10/1988 | Matsumoto et al. | 358/105 |
| 4,799,267 | 1/1989 | Kamejima et al. | 382/1 |
| 4,825,394 | 4/1989 | Beamish et al. | 356/147 |
| 4,868,871 | 9/1989 | Watson, III | 382/1 |
| 4,931,868 | 6/1990 | Kadar | 358/125 |
| 5,018,218 | 5/1991 | Peregrim et al. | 358/105 |
| 5,034,986 | 7/1991 | Karmann et al. | 382/1 |
| 5,062,056 | 10/1991 | Lo et al. | 364/516 |
| 5,111,511 | 5/1992 | Ishii et al. | 382/1 |
| 5,157,732 | 10/1992 | Ishii et al. | 382/1 |

OTHER PUBLICATIONS

J. F. S. Yau et al., "A Feature Tracking Method for Motion Parameter Estimation In A Model Based Coding Application", Third International Conference on Image Processing, Jul. 18-20, 1989, published in IEE Conf. Publ. No. 307, pp. 531-535.

E. Badique, "Knowledge-Based Facial Area Recognition and Improved Coding" in CCITT-Compatible Low-bitrate Video-Code, presented at Picture Coding Symposium, Mar. 26-28, 1990.

K. P. Karmann et al., "Moving Object Recognition Using an Adaptive Background Memory", Time-varying Image Processing and Moving Object Recognition, Ed. V. Capellini, pp. 289-296.

*Primary Examiner*—Michael T. Razavi
*Assistant Examiner*—Steven P. Klocinski
*Attorney, Agent, or Firm*—Michael E. Marion

[57] ABSTRACT

A method of tracking a moving object in a scene, for example the face of a person in videophone applications, comprises forming an initial template of the face, extracting a mask outlining the face, dividing the template into a plurality (for example sixteen) sub-templates, searching the next frame to find a match with the template, searching the next frame to find a match with each of the sub-templates, determining the displacements of each of the sub-templates with respect to the template, using the displacements to determine affine transform coefficients and performing an affine transform to produce an updated template and updated mask.

13 Claims, 3 Drawing Sheets

METHOD AND APPARATUS FOR TRACKING A MOVING OBJECT

BACKGROUND OF THE INVENTION

The invention relates to a method of and to apparatus for tracking a moving three dimensional object in a scene captured as a series of two dimensional picture frames.

The invention may be used for many applications such as medical, industrial automation, inspection, CD-I (compact disc-interactive) authoring, films on disc, digital television broadcasting, etc., but will be described herein with particular reference to its use in videophone and CD-I applications.

A method of tracking a face is disclosed in a paper by J. F. S. Yau and N. D. Duffy entitled "A Feature Tracking Method for Motion Parameter Estimation In A Model-Based Coding Application" presented at the Third International Conference on Image Processing, and its Applications held at Warwick on the 18-20th of July of 1989 and published in IEE Conference Publication No. 307 at pages 531 to 535.

This paper presents:

"a method by which the dynamics of facial movement may be parameterised for application in a model-based image coding scheme. A tracking algorithm is described whereby the bounding boxes of the eyes, nose and mouth of the subject are initially located and then tracked over subsequent frames using both block matching and code-book search techniques. The six degrees of freedom required to define the position and orientation of the head are derived from the tracked box positions by means of a motion parameter estimation algorithm. Implementation of the algorithm involves interpreting the spatial distribution of the box positions and relating them to a simplified topological three-dimensional model of the face.

The estimation of the position and orientation for each frame of the analysed image sequence is performed in two phases. The first phase involves tracking the eyes, nose and mouth over the image sequence. This was achieved by locating the facial features within the first frame and then tracking them over subsequent frames using block searching and code-book techniques. The initial feature location was performed manually, but all processing thereafter was performed by software algorithms. Feature locations were represented by boxes which fully enclosed the facial features concerned. The result of the first phase, the tracking phase, of the image sequence analysis is therefore a description of the trajectory of the facial feature boxes over the image sequence along the temporal axes. The second phase, termed the motion parameter estimation phase, interprets the spatial distribution of the facial feature boxes for each frame to provide an estimate of position and orientation. The task of recovering 3-D information from 2-D data was achieved by referring the facial feature box positions to a simplified topological model of the face.

The derivation of 3-D information from image sequence analysis for the picture-phone application does not demand as much accuracy and precision as in applications such as robot vision. The latter demands precise and absolute measurements of angles and distances. In the case of facial images it suffices to approximate the position and orientation parameters. It is more important that the dynamics of the facial movement are reproduced in perfect synchronisation with the dynamics from the original image sequence. This is because it is the dynamics of facial movement rather than absolute position and orientation that convey the visual nuances of communication across the channel."

The method described by Yau and Duffy suffers from a number of disadvantages. First, it is incapable of tracking a face if one of the eyes or the mouth is occluded, that is an object is passed in front of it. Secondly, it cannot track a face if the head is turned so far that one eye becomes invisible to the camera. Thirdly, it requires identification of specific features of the face i.e. eyes, nose, mouth.

It is an object of the invention to provide an improved object tracking method and, in one aspect, to make the method robust to occlusion of the object to be tracked.

SUMMARY OF THE INVENTION

The invention provides a method of tracking a three dimensional object in a scene over a series of two dimensional picture frames, the method comprising:
a) forming an initial template of the object to be tracked;
b) extracting a mask outlining of the object to be tracked;
c) dividing the template into a plurality of sub-templates which are not associated with specific features of the object;
d) searching each successive frame to find a match with the template in the preceding frame;
e) searching each successive frame to find a match with each of the sub-templates in the preceding frame;
f) determining in each successive frame the displacements of the positions of each of the sub-templates with respect to that of the template;
g) using the displacements to determine coefficients for a bivariate transform capable of mapping the displaced positions; and
h) performing the transform to produce an updated template and updated mask.

Splitting the template into a number of sub-templates and applying a local matching process to each of the sub-templates allows a measurement of the distortion of the object as it changes orientation, and this can be used to define coefficients of a bivariate transform, such as, the affine transform which will enable prediction of the new appearance of the object. Other transforms which may be used include higher order polynomial functions or Fourier coefficients. Since the sub-templates are not associated with specific features of the object the invention may be used to track any object and is not restricted to the tracking of faces or other defined objects. There is greater freedom to choose the number of sub-templates to be formed so that a certain redundancy can be built in to allow the tracking to continue even when the object is partially occluded. The method does not depend on certain object features being visible in the picture, and, hence, the degree of rotation of the object is not constrained by a necessity to keep certain features of the object visible.

The area of search for each of the sub-templates may be a restricted area around its template matched position.

By restricting the search area the time taken for the search is minimized; and with sub-templates which are not feature dependent, the likelihood of matching sub-template with a similar distant part of the object is reduced. For example, without that restriction, a sub-template covering the left cheek of a face may become matched with the right cheek if some search area restriction is not imposed.

The method may comprise the further step of i) extending the initial template by repeating pixels at the boundary of the object.

The application of the transform causes interpolation of pixel values across the boundary of the object. Consequently, if the background pixels are left around the object or if the background is blanked, incorrect values for interpolation may be produced, particularly if the background pixel values are markedly different from the object pixel values. In such a case, the boundary of the object will then become indistinct, especially with repeated applications of the transform over many successive picture frames.

The method may comprise the further step of j) setting the luminance of each pixel within the mask to a first constant value and setting the luminance of each pixel outside the mask to a second constant value.

This allows the determination of the outline of the object, which is lost when the template is extended. By setting the luminance, for example, to black outside the boundary and to white inside the boundary, sharp threshold can be maintained at the boundary.

The method may include the further step of k) discarding each sub-template in which the object to be tracked occupies less than a given proportion of its area.

The given proportion may lie between 20 and 30%.

This reduces the possibility of finding a false local match of the sub-templates where there is little information concerning the object contained within the sub-template. The actual proportion chosen will depend on the number of sub-templates into which the template is divided and the extent to which false matching in a typical application may be found.

The method may comprise the further steps of l) discarding any sub-template for which a local match cannot be found, m) determining whether a minimum number of sub-templates remain, and n) where a minimum number of sub-templates remain, using their displacements to calculate the transform coefficients.

The minimum number may be six.

This enables partially occluding objects to be dealt with, provided that a sufficient number of sub-templates are unoccluded, then the coefficients of the transform for the whole object can be calculated. If the object is totally occluded or occluded to such an extent that insufficient sub-templates remain to enable calculation of the transform coefficients to be made, then the coefficients calculated in the previous frame may be re-used to predict the position and the appearance of the object.

When less than the minimum number of sub-templates remain the search area for matching the template may be increased for the next frame.

Since the object is not visible for one or more frames, its predicted position will be subject to greater errors, and increasing the search area will give an increased probability of finding a match.

The method may comprise the further steps of o) comparing the updated template with the region of the next frame selected by the transformed mask at the position of the template match, and p) using the results of the comparison to control the gain correction term of a Kalman filter.

Since the transform cannot normally represent all changes in the appearance of a three dimensional object, the prediction of what the object looks like, obtained from the transformation, may deviate from the actual appearance. By using a Kalman filtering process, the object appearance can be updated by incorporating the actual appearance. This is achieved by adding a proportion of the present picture, the proportion being determined by whether or not occlusion occurs. That is, a high proportion of the present picture is incorporated if no occlusion is present and a low proportion of the present picture is incorporated if occlusion of the object is detected, since it is not normally desired that the occluding object is incorporated into the object being tracked. However a small proportion of the picture is incorporated so that changes such as a person putting on a pair of spectacles eventually became incorporated in the object being tracked.

The comparison in step o) may be made using the average of the 8-connected pixel values. This reduces the effect of noise.

Step o) may include the steps of o1) for each pixel taking a block of $3 \times 3$ pixels having the pixel of interest at its centre;

o2) displacing the block by one pixel in each direction in turn;

o3) comparing for each displacement the pixels within the updated template with the current picture and calculating a difference value;

o4) finding the lowest difference value; and o5) outputting that lowest value as the result of comparison.

This difference value may be calculated on the basis of, for example, mean square values or absolute values, or may be any other correlation function, for example, the dot product of the pixels in the succeeding frames in which case the smallest differences between the two frames gives the greatest dot product value.

By this means, errors produced by small misalignment of areas, including fine details, will be reduced.

When a match is not found the transform may again be applied to the template to predict the shape and position of the template in the next frame.

Thus, if the object is wholly or substantially wholly occluded, a prediction of its position and shape can be made from its previous history.

The invention further provides apparatus for tracking a three dimensional object in a scene over a series of two dimensional picture frames, comprising means for forming an initial template including the object to be tracked; means for extracting a mask outlining the object to be tracked; means for dividing the template into a plurality of sub-templates; means for searching each successive frame to find a match with each of the sub-templates in the preceding frame; means for determining in each successive frame the displacements of the positions of each of the sub-templates with respect to that of the template; means for determining, using the displacements, transform coefficients for a bivariate transform capable of mapping the displaced positions; and means for performing the transform to produce an updated template and updated mask.

The apparatus may comprise means for restricting the area of search around the template matched position for each of the sub-templates.

The apparatus may further comprise means for extending the initial template by repeating pixels at the boundary of the object.

The apparatus may further comprise means for setting the luminance of each pixel within the mask to a first constant value and setting the luminance of each pixel outside the mask to a second constant value.

The apparatus may further include means for discarding each sub-template in which the object to be tracked occupies less than a given proportion of its area. The given proportion may lie between 20 and 30%.

The apparatus may further comprise means for discarding any sub-template for which a local match cannot be found, means for determining whether a minimum number of sub-templates remain, and means for, where a minimum number remain, using their displacements to calculate the transform coefficients. The minimum number may be six.

Means may be provided for increasing the search area for matching the template for the next frame when less than the minimum number of sub-templates remain.

The apparatus may further comprise means for comparing the updated template with the region of the next frame selected by the transformed mask at the position of the template match and using the results of the comparison to control the gain correction term of a Kalman filter. The comparison may be made using the average of the 8-connected pixel values.

The comparing means may comprise means for, for each pixel, taking a block of 3×3 pixels having the pixel of interest at the centre, means for displacing the block by one pixel in each direction, in turn, means for comparing, for each displacement, the pixels within the updated template with the current picture and calculating a difference value, means for finding the lowest difference value, and means for outputting the lowest difference value as a result of the comparison.

By comparison means is meant also means for producing the dot product of successive frames in which case the lowest difference is represented by the greatest dot product.

The transform may be again applied to the template to predict the shape and position of the template in the next frame.

The invention still further provides a video telephone terminal comprising a video camera, means for identifying a face within the picture produced by the camera, means for tracking the position of the face in successive picture frames, a codec producing an output to be connected to a telephone line, the codec having a first input to which the output of the video camera is coupled and a second input connected to an output of the tracking means, wherein the codec is arranged to produce an output whose resolution is dependent on the signal at its second input and the tracking means comprises apparatus as set forth in any of the preceding paragraphs.

The invention further provides a method of encoding a series of two dimensional pictures representing a scene, including a moving three dimensional object, comprising the steps of a) generating a video signal representing the series of two dimensional pictures, b) forming an outline of the three dimensional object, c) tracking the three dimensional object by means of a method as set forth in any of the preceding paragraphs, and d) encoding the video signal at a higher resolution when representing portions of the picture within the outline than when representing portions of the picture outside the outline.

The encoding is typically carried out on blocks of pixels, for example, blocks of 16×16 pixels. The changing of resolution will be carried out on a block basis which may not correspond exactly with the object outline. In this case, it is preferable that blocks having any portion falling within the outline are sent at the higher resolution, although, of course, it would be possible to send blocks having a higher resolution only when such blocks fall wholly within the outline.

The invention still further provides apparatus for encoding a series of two dimensional picture frames representing a scene including a moving three dimensional object, the apparatus comprising means for generating a video signal representing the series of two dimensional pictures, means for forming an outline of the three dimensional object, means for tracking the three dimensional object over a series of picture frames, said tracking means comprising apparatus as set forth in any of the preceding paragraphs, and means for encoding the video signal such that areas within the outline are encoded with a greater resolution than those outside the outline.

The apparatus may be arranged for encoding pictures for recording on record carriers for Compact Disc Interactive (CD-I) players, wherein the means for forming an outline comprises computing means coupled to a display means and having an input device enabling a user to create an outline around the object, the encoding means is coupled to a CD-I emulator, and the CD-I emulator is arranged to enable replay of the series of pictures on the display means.

BRIEF DESCRIPTION OF THE DRAWINGS

The above and other features and advantages of the invention will become apparent from the following description of an exemplary embodiment of the invention with reference to the accompanying drawings in which.

DETAILED DESCRIPTION OF PREFERRED EMBODIMENTS OF THE INVENTION

Figure 1:
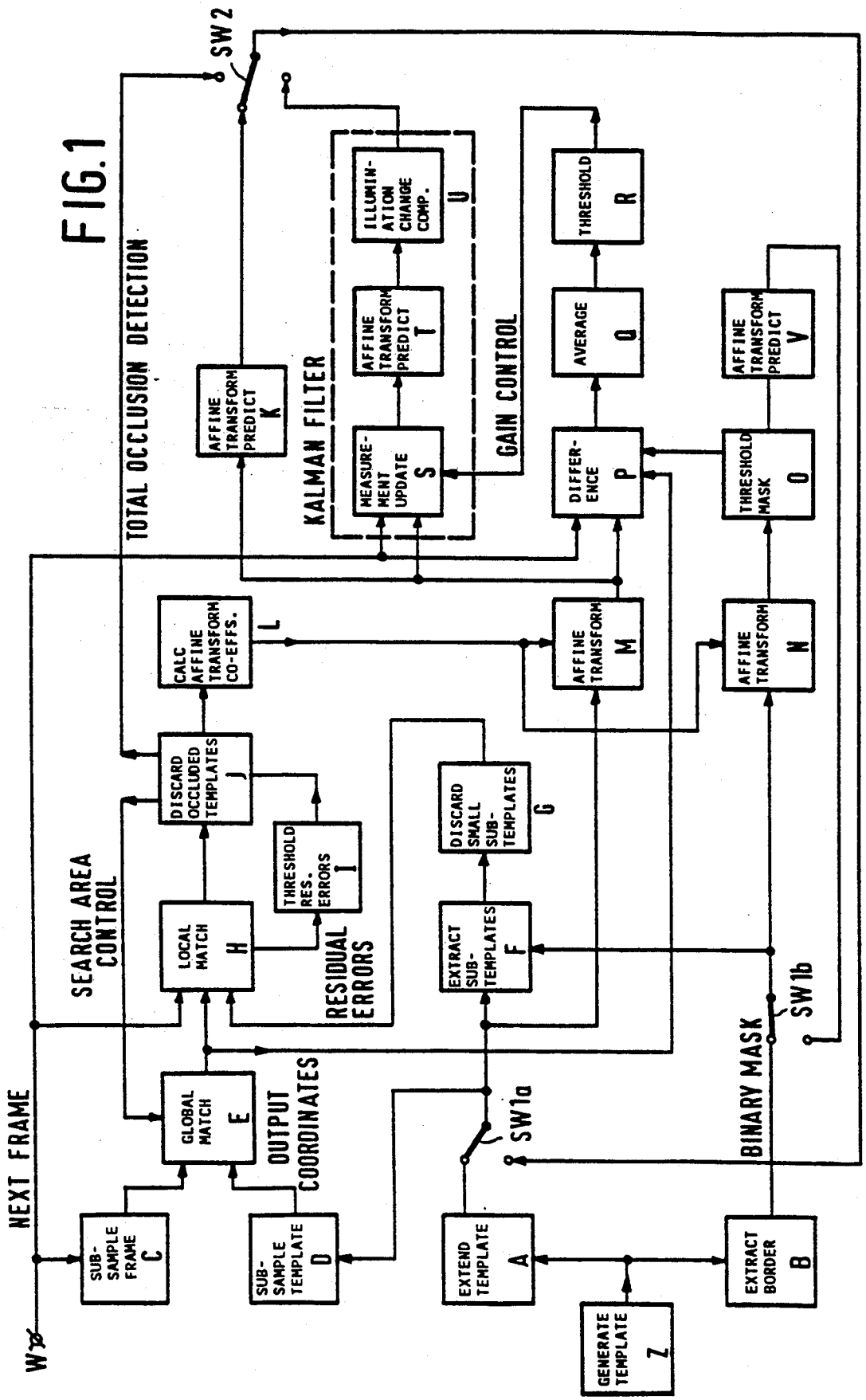
FIG. 1 illustrates in block schematic form a method according to the invention.

In FIG. 1 the block Z represents the generation of an initial reference template of the object to be tracked, for example, the face of a person for videophone applications. The initial template is extracted from the first frame(s) and, depending on the application, may be formed manually by an operator tracing the outline of the object or may be achieved automatically as described in a paper by E. Badiqué entitled "Knowledge-Based Facial Area Recognition and Improved Coding in a CCITT-Compatible Low-bitrate Video-Codec" presented at the Picture Coding Symposium at Cambridge, Mass. on 26-28th March 1990. The original template is extended by pixel repeating (block A) and a binary mask of the template is produced (block B).

The next picture frame is applied via input W and is subsampled (block C) while the template is subsampled (block D). It is, of course, possible to omit the subsampling steps, but this will require increased storage and signal processing capability. A region of search, which may be proportional to the template size in the subsampled picture (block C) or may be controlled by an operator, is compared to the sub-sampled extended template (block D) in a global matching process (block E). A decision is made, based on the matching criteria, as to where the most likely position of the object in the picture is.

As the sequence of pictures progresses, the object may be changing its orientation. As a result, the similarity between the actual picture and the reference may be reduced, and the template matching process becomes degraded and may eventually lead to a system failure. To overcome this problem the template is updated. The template is divided into uniform, preferably rectangular sub-templates (block F), and sub-templates having less than a quarter of face intensity pixels are discarded (block G). Each of the remaining sub-templates are then matched and registered locally (block H). The picture is processed in small areas around the detected object position to locate object features which are contained in the individual sub-templates. That is, when a global match has been obtained the search area for each of the sub-templates is restricted so that sub-templates are not erroneously matched with similar areas in remote parts of the object. For example, when the object to be tracked is a face and the sub-template covers a portion of the left cheek, a good match may be possible with a portion of the right cheek, as both cheeks are likely to be similar in appearance. Restricting the area of the search will reduce the possibility of such an erroneous match being made. The minimum cost function obtained from the local registration process is thresholded (Block I) to enable potentially occluded areas to be discarded (block J). The global area of search for the next frame is increased if insufficient local matches are found and reset to its original size when a satisfactory match is found.

One problem which may occur if a sub-template includes a lot of fine detail is that a small misalignment may produce a large error signal. To overcome this problem a 3×3 block of pixels centred on the pixel of interest is taken and this block is displaced by one pixel in each direction in turn. At each displacement the updated sub-template is compared with the current picture and a difference value is taken. The final value adopted is that which produces the lowest difference value. Typical areas where this procedure is advantageous are areas of hair and articles such as neckties which have thin stripes.

When there are no occluded areas, or only a small percentage of the object has been detected as being occluded, the inter frame distortion in the object can be measured, that is, the displacements of the individual sub-templates with respect to the template are evaluated. From this evaluation coefficients of an affine transform are calculated (block L). The affine transform is then applied to the extended template (block M) and the binary mask (block N) to correct for geometrical distortion of the object. The affine transformed binary mask is thresholded (block O) so that an exact object boundary is obtained. This step is included because the affine transform adds grey level intensity values to the boundary region which increases the size of the template in every iteration of the algorithm, and would lead to erroneous results in the template update. The extended and updated template is used inside the boundary given by the binary mask during the global matching procedure. The extension of the template is required as the affine transform uses pixel values just outside the boundary in order to compute the values on the boundary. The threshold binary mask is again affine transformed (block V) and used as the binary mask for the next frame via switch SW1$b$.

The results of the affine transform (block M) could be fed directly to SW1$a$ to be used as the template for the next but this is not robust, errors will accumulate. In the embodiment shown in FIG. 1, the template is instead updated using information from the current frame for those parts of the template which are unoccluded. Occlusion detection is performed by comparing the updated template (block P) with the region in the actual image selected by the transformed mask at the position found by the global match. An occluding object is detected by analysing the difference image which is generated by subtracting from the reference template the corresponding region in the actual picture. This difference is taken over the average of the 8-connected pixel values (block Q) to reduce the noise sensitivity in the comparison. The 8-connected pixels are the eight pixels immediately surrounding a given pixel, that is the neighbouring pixels in the horizontal, vertical and both diagonal directions. It is not essential to average over the 8-connected pixels, and any other suitable noise filtering technique may be used.

Furthermore, the large differences which may be caused by slight misalignments between edges in the reference template and the actual picture may be reduced by displacing the 3×3 blocks of 8-connected pixels by one pixel in each direction, in turn, and, for each displacement comparing the pixels in the block from the updated template with those from the current picture and calculating a mean difference value. In this case, the output of block Q would be the minimum of these means differences.

The threshold in block R is set to distinguish between discrepancies in the model and changes in the object environment such as occlusion. The results of thresholding the difference image are used to generate a mask of the occluding object which can be used to select between the template and the actual picture. For the unoccluded object areas, a high percentage of the object in the actual scene is included. If partial occlusion of the object occurs, then these regions are corrected using the partial information available from the unoccluded areas of the object and from the tracking process. The gain is set to a low value rather than zero, so that, if, for example, the occluding object is a pair of spectacles which are put on, the spectacles will gradually appear as the picture is regularly updated.

The result of this update (block S) may be used directly as the template for the next frame, in which case, the output of block S is directly connected to switch SW1$a$, but a better match can be found by reapplying the affine transform (block T) to predict its appearance in the following frame. In this case the output of block T is connected directly to switch SW2.

The embodiment shown in FIG. 1 includes a further refinement in which the template update and prediction are encapsulated within a Kalman filter. This gives the additional feature of tracking and predicting illumination changes which are another possible source of differences between the template and the actual image.

The mechanism described above for updating the template is incorporated within the measurement update (block S) of the Kalman filter, with the occlusion detection signal controlling its gain. The measurement update of the Kalman filter also includes the temporal derivative of each pixel in the template and the combination of the two form the state variables of the Kalman filter. The prediction phase of the Kalman filter includes both the affine transform prediction (block T), to predict changes in the position of the face, and the application of the Kalman state-space matrix to the state variables to account for illumination changes (block U). The elements of the state-space matrix may be the same as those used by Karmann and von Brandt as disclosed in "Moving Object Recognition Using an Adaptive Background Memory", Time-varying Image Processing and Moving Object Recognition, Ed. V. Capellini, pp 289-296, Springer-Verlag, Berlin, 1990. If the object could not be detected in the registration process, that is, it was largely or completely occluded, the updating and the Kalman filtering stages are omitted, and instead, the position and size of the object in the next frame are predicted by applying the affine transform calculated in the previous picture (block K).

The switches SW1a and SW1b are in the position shown in the drawing only when the initial template is being generated, the template being updated and fed-back via the switch SW2. The switch SW2 is controlled so that when the object is mainly or totally occluded it is in the position shown in the drawing, while if the object is not, or is only partially occluded, it adopts the second position to select the output of the Kalman filter.

The method according to the invention involves both global and local matching and uses adaptive template matching to follow the object. Thus, starting with an initial view of the object to be tracked, the process searches for a similar pattern in the following frames. The template is updated to cater for changes in the orientation and appearance, and hence shape and size, of the object from frame to frame. It is assumed that these changes are small in any inter-frame period. In some aspects of the invention, however, the updating procedure is able to handle occlusion, and hence significant inter-frame changes, and ensures that occluding features are not incorporated in the template. Thus, in videophone applications, persons head is unlikely to move quickly over large distances and can be tracked, whereas objects may be passed in front of the face and it is not desired to incorporate these objects in the face.

The method by which the initial template is found is not critical and will depend on the application. In a real time application such as videophone terminals, it is convenient to use the method described by E. Badiqué as referenced hereinbefore, but if used in a non-real time application, such as CD-I authoring, the initial template could be formed manually. Once the initial template has been produced it is used to track the object. It has previously been proposed to track objects such as faces using several small templates on critical features, for example, eyes and mouth. This is not robust, particularly where occlusion occurs. The present method uses a global match with a template of the complete object, for example face, before further processing. The template and the scene may be sub-sampled to reduce the computation required, and the search area restricted to near the point where the template was located in the preceding frame. The extent of the search area may be proportional to the size of the template so that the method can be used with faces (or objects) at different ranges.

Having found the most probable position for the face, the template is updated to give a true representation of the appearance of the face in the new frame. The changes in the appearance of the face are detected by local or sub-template matching. The template is divided into sub-templates which are preferably uniform and rectangular which are matched with the contents of the current frame over a small area around the global match position. If the matching cost function at a particular point is too high for a particular sub-template, then it is assumed that in the area of that sub-template the object is occluded and that sub-template is not further processed. Only sub-templates for which more than one quarter of their pixels are active are included in the local matching process. The local matching of the sub-templates gives a set of displacements representing the inter-frame distortion of the face, and these displacements are used to calculate the coefficients of an affine transform which is applied to the whole template.

To limit the extent of the template matching, it is necessary to know the boundary of the object to be tracked. One way of achieving this is to set up a binary mask having the same shape as the original template. The affine transform is applied to this mask, as well as to the template itself, and the transformed mask is thresholded to obtain the boundary for the template in the next frame. Such a procedure is necessary as there is not a one to one correspondence between the pixel positions in the old and new templates, and the new pixel values are formed by interpolation between old pixel values. If the area around the old template is set to zero, then the affine transform incorrectly uses these values for transforming around the boundary causing the template to become dimmer around the boundary. To prevent this the old template may be extended by repeating the pixel values outside the boundary. The old template may be extended by other means besides repeating pixel values, for example, by bilinear interpolation. Although this procedure prevents the boundary from becoming dimmer, it requires the maintenance of a separate record of the template shape, and this is produced in parallel by the mask. The mask is formed by allocating a large value to pixels inside the boundary, and a small value to pixels outside the boundary so that when the affine transform is applied, the output can be safely thresholded to recover an accurate boundary shape.

Although the affine transform can provide a reasonable model for changes in the appearances of a face over a few frames, it cannot represent all of the changes accurately, and repeated interpolation rapidly reduces the spatial resolution of the template. To improve the performance, the template update and prediction may be encapsulated within a Kalman filter. This gives the additional feature of tracking and predicting illumination changes which are another possible source of differences between the template and the actual image.

The mechanism for updating the template is incorporated within the measurement update (block S) of the Kalman filter, with the occlusion detection signal controlling its gain. The measurement update of the Kalman filter also includes the temporal derivative of each pixel in the template, and the combination of the two form the state variables of the Kalman filter. The prediction phase of the Kalman filter includes both the affine transform prediction, to predict changes in the position of the face, and the application of the Kalman state-space matrix to the state variables, to account for illumination changes. The elements of the state-space matrix may be the same as those used by Karmann and von Brandt as referenced hereinbefore.

The affine transform requires at least six co-ordinate pairs in order to compute its coefficients. If less than six are found, i.e. less than six sub-template matches, then it is assumed that most of the face is occluded and the affine transform calculated for the previous frame is applied again to make a prediction for the following frame. This works on the assumption that the face is changing smoothly, but where total occlusion is found, the global search area is increased for the next frame so that the tracking can recover when the face becomes visible again. This procedure is repeated as long as the occlusion lasts, unless the time reaches a threshold level when a supervisory system can be informed and initiate an initialization procedure. The search area is reset to its original size each time a match is obtained.

When at least six local or sub-template matches have been found, then areas of the face which have been occluded can be detected by taking the difference between the transformed template and the actual scene. The differences are averaged over a small region, for example 3×3 pixels, to reduce the sensitivity to noise, and those pixels with differences which exceed a given threshold value are assumed to be occluded.

Where occlusion is detected, the gain of the Kalman filter is set to a low value, so that only a small proportion of the present frame is incorporated. The gain is not set to be zero, so that if the occlusion persists for a long time, the occluding object is eventually included. This covers cases such as a person putting on spectacles where the spectacles, are initially an occluding object but subsequently become part of the face as far as the picture is concerned. Where no occlusion is detected, the gain of the Kalman filter is set to be high, but not to unity. This reduces the sensitivity of the template to noise.

When a model of the probable appearance of the unoccluded face has been obtained, a prediction of its appearance in the next frame is produced. This is achieved by reapplying the affine transform to the updated template, and then, applying the Kalman state-space matrix to account for illumination changes which are not handled by the affine transform.

Figure 2:
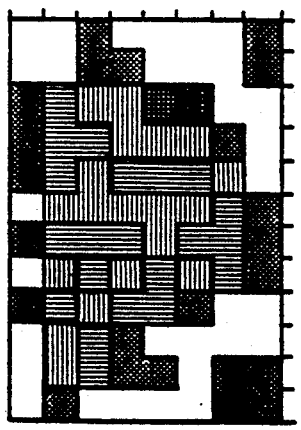
FIG. 2 shows an example of an initial template.
Figure 3:
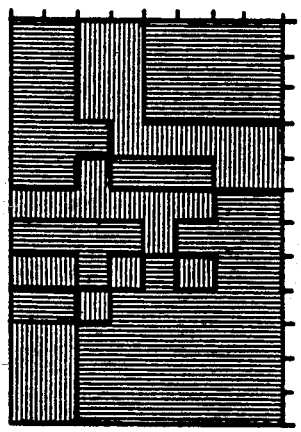
FIG. 3 shows the initial template of FIG. 2 extended by repeating pixel values at the boundary.
Figure 4:
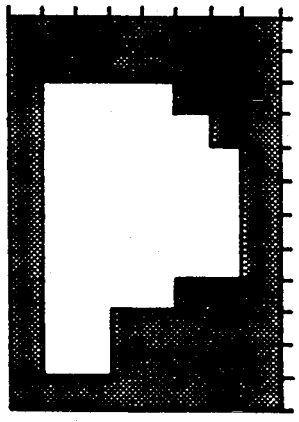
FIG. 4 shows a binary mask of the object.
Figure 5:
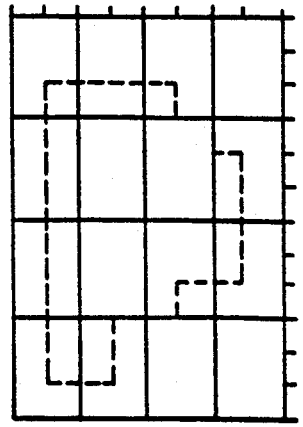
FIG. 5 shows the initial template divided into sixteen sub-templates.

FIG. 2 shows an example of an initial template in an area having eight pixels horizontally and twelve pixels vertically, in which the vertical and horizontally hatched pixels represent the object to be tracked and the solid and unshaded pixels represent the background. FIG. 3 shows the extended template where the background pixels are replaced by pixels having the same intensity as those at the boundary of the object. FIG. 4 shows the binary mask which gives the outline of the object, the pixels inside the outline being at high intensity (white) and those outside the outline being at low intensity (black). It is of course possible to reverse these values or to make them two different colours. FIG. 5 shows the sub-templates over the dotted outline of the object. In this case, there are sixteen rectangular sub-templates, but number and shape are arbitary choices, and a different number of differently shaped sub-templates could be used.

Figure 6:
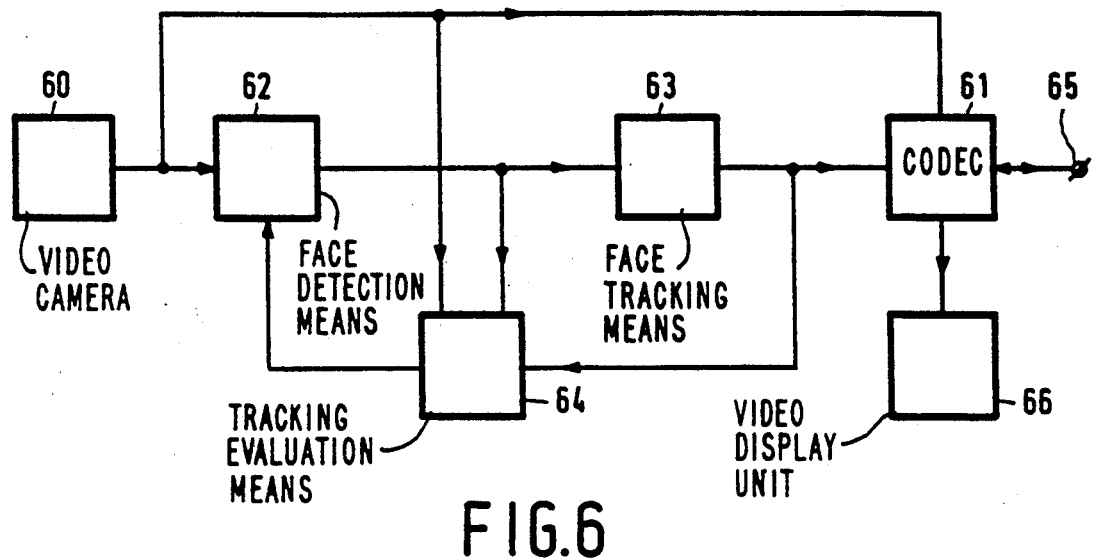
FIG. 6 shows in block schematic form a video telephone terminal according to the invention.

FIG. 6 shows in block schematic form a video telephone terminal comprising a video camera 60, whose output is fed to a first input of a Codec 61, to a first input of a face detection means 62, and to a first input of a tracking evaluation means 64. The face detection means 62 may be constructed in accordance with the publication by E. Badiqué as referenced hereinbefore. The output of the face detection means 62 is fed to an object tracking means 63, which may be realized, as described with reference to FIGS. 1 to 5 hereof, and to a second input of a tracking evaluation means 64. The output of the face object tracking means 63 is fed to a second input of the Codec 61 and to a third input of the tracking evaluation means 64. The Codec 61 is connected to a port 65, via which communication with other terminals may take place, and to a video display unit 66, which displays pictures received from other terminals over the communications link.

The face detection means 62 locates the head and shoulders of the terminal user in the first few picture frames and passes a face outline to the object tracking means 63. Once the face detection means 62 has performed this function it is disabled. At the same time, the tracking evaluation means 64 receives, from the face detection means 62, characteristics of the face and stores those characteristics. The face outline produced by the object tracking means 63 is fed to the tracking evaluation means 64, and characteristics of the tracked object are compared with the stored characteristic to ensure that the object tracking means 62 is still tracking the face and has not locked on to some other object in the scene. One way of achieving this function is to compare skin colours of the stored and tracked objects. If the tracking evaluation means 64 indicates that correct tracking has been lost, then it enables the face detection means 62 and the process is re-initialised to enable the face to be located and tracking of the face to be restarted.

The Codec 61 may be realized according to the CCITT SG XV H.261 n×64 K bits/s video codec where n is an integer. The first input receives the video signal from the video camera 60 while the second input receives the output of the object tracking means 63, the characteristics of this output controlling the resolution with which the picture is encoded for transmission such that the face is transmitted at a higher resolution than the background.

Clearly, if the majority of the scene is the face of the person communicating, then there can be no purpose in transmitting this at higher resolution. In this case, it would be useful to send the eyes and mouth only at the increased resolution since these are the parts of the face that the viewer concentrates on. In this case, means for detecting the eyes (and mouth) would be provided rather than means for detecting the whole face. This may be a two stage process, so that, the face is recognised first and then the individual features (eyes and mouth) are located. Tracking may then follow substantially as described. With, of course, more than one object having to be tracked), separate tracking means for each object may have to be provided.

Figure 7:
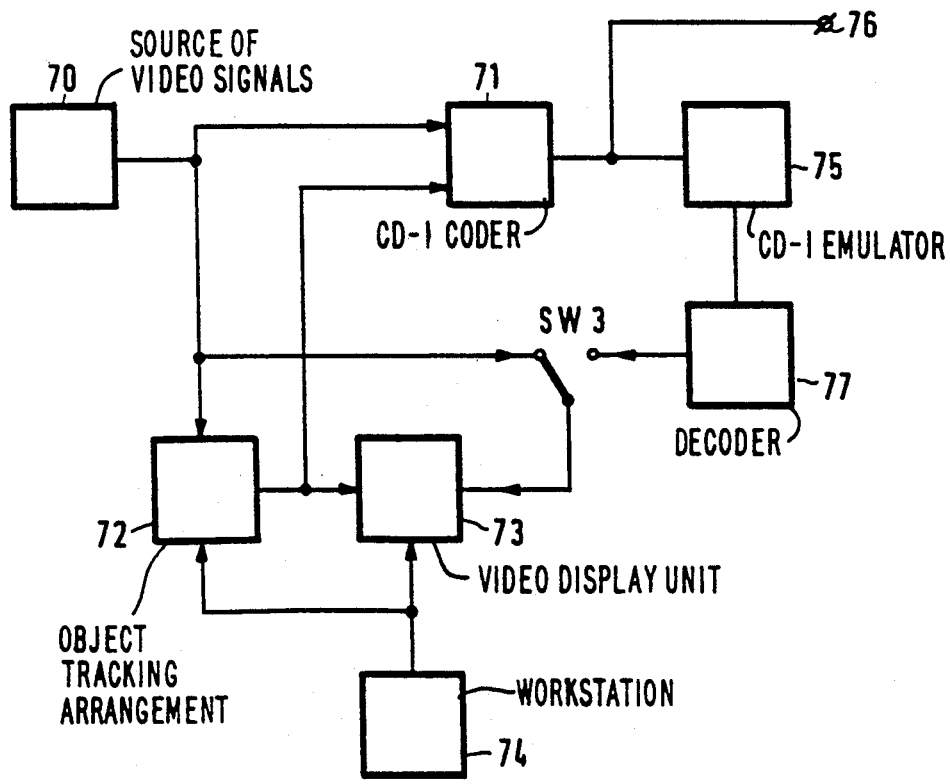
FIG. 7 shows in block schematic form a Compact Disc Interactive (CD-I) authoring apparatus according to the invention.

FIG. 7 shows, in block schematic form, an authoring workstation for creating video sequences for Compact Disc Interactive (CD-I) discs. The apparatus comprises a source of video signals 70 which may be a video cassette player, but could be any convenient source. The output of the video source 70 is fed to a first input of a CD-I coder 71, to an object tracking arrangement 72, and, via a switch SW3, to a video display unit 73. A workstation 74, such as that sold by Sun Microsystems Inc., is connected to the video display unit 73 and the object tracking arrangement 72 to enable a user to control assembly of a video sequence to be encoded. The output of the object tracking arrangement 72 is connected to the video display unit 73 and to a second input of the CD-I encoder 71. The output of the CD-I encoder 71 is connected to a CD-I emulator 75 and to an output 76. The output of the CD-I emulator 75 is connected via a decoder 77 to the switch SW3.

In operation, the user extracts an outline of the object to be tracked using the workstation 74, for example by using a mouse as an input device and tracing an outline around the object on the screen of the video display unit 73. During this process, the switch SW3 will be in the position shown in FIG. 7 and consequently pictures from the video source 70 will be displayed on the VDU 73. A sequence of pictures can then be encoded using the CD-I coder 71. Thus the workstation 74 provides the original object mask which is processed as described with reference to FIGS. 1 to 5 in the object tracking arrangement 72. The object tracking arrangement 72 produces an output which is fed to the second input of the CD-I coder 71 to control the resolution with which the video signal from the video source 70 is encoded. In this application, it will not normally be possible to identify the object automatically, as with the face in video telephone apparatus, since the nature of the object to be tracked is selected by the user and will have many possible forms. Further, since the user will be viewing the sequence of pictures to be encoded on the VDU 73, it will not be necessary to have an automatic evaluation of the tracking as in the video telephone application since the user will be able to see whether the tracking is satisfactory.

As is known, a CD-I authorizing station will include a CD-I emulator 75 and a decoder 77 to enable the user to check whether an encoded sequence is satisfactory. To enable this to be done, the switch SW3 is arranged to connect the output of the encoder to the VDU 73, instead of the video signal from the video source 70. Operation of this switch SW3 will be under the control of the user and may conveniently be achieved with the aid of the workstation keyboard or mouse.

The object tracking arrangement can of course be used with apparatus for generating sequences of pictures for any multi media applications and not just those according to the CD-I standard.

From reading the present disclosure, other modifications will be apparent to persons skilled in the art. Such modifications may involve other features which are already known in the design, manufacture and use of object tracking systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein, either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of tracking the movement of a three dimensional object in a scene over a series of two dimensional picture frames, the method comprising the steps of
   a) forming an initial template in an initial frame of the series, said initial template including the moving object to be tracked;
   b) dividing said initial template into a plurality of sub-templates which are not associated with specific features of said object;
   c) searching a subsequent frame of said series to locate a first region of said subsequent frame which matches said initial template and determining a first displacement in position between said initial template and said first region of said subsequent frame;
   d) searching said subsequent frame of said series to locate respective sub-regions of said subsequent frame of said series which match respective sub-templates of the initial template and determining respective additional displacements in position between each sub-template and its respective matched sub-region of said subsequent frame;
   e) determining from the first displacement and the additional displacements, a relative displacement in position between said first region of said subsequent frame and said respective sub-regions of said subsequent frame;
   f) using said relative displacement to determine coefficients for a bivariate transform capable of mapping said first and additional displacements in position; and
   g) performing said bivariate transform to produce an updated initial template.

2. A method as claimed in claim 1 comprising the further steps of:
   a) extracting a mask from the initial frame outlining said object;
   b) producing an updated mask using said bivariate transform; and
   c) determining the boundary of said updated initial template using said updated mask.

3. A method as claimed in claim 1 or claim 2 in which the search for each of the sub-regions is restricted to a limited area with respect to said first region.

4. A method as claimed in claim 2 comprising the further step of:
   setting the luminance of each pixel within the mask to a first constant value and setting the luminance of each pixel outside the mask to a second constant value.

5. A method as claimed in claim 1, comprising the further step of
   discarding each sub-template in which the object to be tracked occupies less than a given portion of that subtemplate's area.

6. A method as claimed in claim 1 comprising the further steps of:
   discarding any sub-template for which a respective sub-region cannot be found,
   determining whether a minimum number of sub-templates remain, and if so
   using their respective additional displacements to calculate said coefficients.

7. A method as claimed in claim 6 in which when less than the minimum number of sub-templates remain, the search area for matching the initial template is increased for the subsequent frame.

8. A method as claimed in claim 2 comprising the further steps of:
  a) comparing the updated initial template with a second region of the subsequent frame corresponding to said updated mask, and
  b) using the results of the comparison to control the gain correction term of a Kalman filter.

9. A method as claimed in claim 2 in which the bivariate transform is an affine transform.

10. An apparatus for tracking the movement of a three dimensional object in a scene over a series of two dimensional picture frames, said apparatus comprising in combination:
  a) means for forming an initial template in an initial frame of the series, said initial template including the moving object to be tracked;
  b) means for dividing said initial template into a plurality of sub-templates which are not associated with specific features of said object;
  c) means for searching a subsequent frame of said series to locate a first region of said subsequent frame which matches said initial template and determining a first displacement in position between said initial template and said first region of said subsequent frame;
  d) means for searching said subsequent frame of said series to locate respective sub-regions of said subsequent frame of said series which match respective sub-templates of the initial template and determining respective additional displacements in position between each sub-template and its respective matched sub-regions of said subsequent frame;
  e) means for determining from the first displacement and the additional displacements, a relative displacement in position between said first region of said subsequent frame and said respective sub-regions of said subsequent frame;
  f) means for determining coefficients for a bivariate transform capable of mapping said first and additional displacements in position using said relative displacement; and
  g) means for performing said bivariate transform to produce an updated initial template.

11. The apparatus as claimed in claim 10, further comprising:
  a) means for extracting a mask from the initial frame outlining said object;
  b) means for producing an updated mask using said bivariate transform; and
  c) means for determining the boundary of said updated initial template using said updated mask.

12. Apparatus as claimed in claim 11 further comprising means for comparing the updated initial template with a second region of the subsequent frame corresponding to said updated mask and using the results of the comparison to control the gain correction term of a Kalman filter.

13. Apparatus as claimed in claim 10 further comprising means for discarding any sub-template for which a respective sub-region cannot be found, means for determining whether a minimum number of sub-templates remain, and means for, where a minimum number remain, using their respective additional displacements to calculate the coefficients.

* * * * *